US012582932B2

(12) United States Patent
Osawa et al.

(10) Patent No.: US 12,582,932 B2
(45) Date of Patent: Mar. 24, 2026

(54) AIR PURIFIER

(71) Applicant: Brother Kogyo Kabushiki Kaisha, Nagoya (JP)

(72) Inventors: Naokatsu Osawa, Nagoya (JP); Koki Furukawa, Nagoya (JP); Hiroki Sugamata, Nagoya (JP); Masashi Ichihashi, Mizuho (JP); Junji Yamano, Kariya (JP); Keisuke Omori, Nagoya (JP); Ryuta Iijima, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 425 days.

(21) Appl. No.: 18/191,940

(22) Filed: Mar. 29, 2023

(65) Prior Publication Data

US 2023/0233973 A1 Jul. 27, 2023

Related U.S. Application Data

(63) Continuation of application No. PCT/JP2021/010047, filed on Mar. 12, 2021.

(30) Foreign Application Priority Data

Oct. 2, 2020 (JP) ................................. 2020-167459

(51) Int. Cl.
*B01D 46/00* (2022.01)
*B01D 46/42* (2006.01)
(Continued)

(52) U.S. Cl.
CPC ..... *B01D 46/0049* (2013.01); *B01D 46/0005* (2013.01); *B01D 46/4227* (2013.01);
(Continued)

(58) Field of Classification Search
CPC ............ B01D 46/0005; B01D 46/0049; B01D 46/103; B01D 46/4227; B01D 46/521;
(Continued)

(56) References Cited

U.S. PATENT DOCUMENTS

| | | | |
|---|---|---|---|
| 2,065,970 A | 12/1936 | Hartzell | |
| 4,541,847 A | 9/1985 | Oie et al. | |
| 4,722,747 A | 2/1988 | Armbruster | |

FOREIGN PATENT DOCUMENTS

| | | |
|---|---|---|
| CN | 103495313 A | 1/2014 |
| CN | 103933790 A | 7/2014 |

(Continued)

OTHER PUBLICATIONS

Jul. 30, 2024—(JP) Notice of Reasons for Refusal—JP App 2023-197178, Eng Tran.

(Continued)

*Primary Examiner* — Robert Clemente
(74) *Attorney, Agent, or Firm* — Banner & Witcoff, Ltd.

(57) ABSTRACT

An air purifier includes a housing, a first blower, a second blower, and a filter. The housing has a cavity inside, an inlet and an outlet. The first blower has a first fan in the housing. The second blower has a second fan in the housing. The second blower faces the first blower in an opposing direction. The inlet is located between the first blower and the second blower in the opposing direction. The inlet opens in a direction intersecting the opposing direction. The first fan of the first blower and the second fan of the second blower generate airflow such that air flows into the cavity through the inlet, and flows from the cavity through the filter to the outlet.

18 Claims, 8 Drawing Sheets

(51) Int. Cl.
B01D 46/52 (2006.01)
F24F 13/20 (2006.01)
F24F 13/28 (2006.01)
(52) U.S. Cl.
CPC ............ B01D 46/521 (2013.01); F24F 13/20 (2013.01); F24F 13/28 (2013.01); B01D 2273/30 (2013.01); B01D 2275/206 (2013.01)
(58) Field of Classification Search
CPC ........... B01D 2273/30; B01D 2275/206; F24F 13/20; F24F 13/28; F24F 8/108; F24F 8/80
See application file for complete search history.

(56) References Cited

FOREIGN PATENT DOCUMENTS

| CN | 203777825 U | 8/2014 |
|----|-------------|--------|
| CN | 107303450 A | 10/2017 |
| CN | 206934940 U | 1/2018 |
| CN | 108332284 A | 7/2018 |
| CN | 108413597 A | 8/2018 |
| CN | 208124623 U | 11/2018 |
| JP | S60-029531 A | 2/1985 |
| JP | S62-192137 A | 8/1987 |
| JP | S62-192137 U | 12/1987 |
| JP | H01-168316 A | 7/1989 |
| JP | H02-111411 A | 4/1990 |
| JP | H02-091613 A | 7/1990 |
| JP | H09-004867 A | 1/1997 |
| JP | H11-347445 A | 12/1999 |
| JP | 2003-021356 A | 1/2003 |
| JP | 2003-106579 A | 4/2003 |
| JP | 2011-085265 A | 4/2011 |
| JP | 2014-119224 A | 6/2014 |
| JP | 2016-215117 A | 12/2016 |
| JP | 2017-053559 A | 3/2017 |
| JP | 2017-164383 A | 9/2017 |
| JP | 3221391 U | 5/2019 |
| JP | 3226219 U | 5/2020 |
| KR | 102046901 B1 | 12/2019 |

OTHER PUBLICATIONS

Oct. 11, 2024—(JP) Notice of Reasons for Refusal—JP App 2023-197178, Eng Tran.
Mar. 28, 2023—International Preliminary Report on Patentability—App PCT/JP2021/010047, Eng Tran.
May 18, 2021—International Search Report—Intl App PCT/JP2021/010047.
May 18, 2021—(JP) Notice of Reasons for Refusal—App 2020-167459.
Sep. 6, 2022—(JP) Notice of Reasons for Refusal—App 2021-125175.
Aug. 21, 2024—(EP) Extended Search Report—EP App 21874776.4.
Sep. 26, 2023—(JP) Notice of Reasons for Refusal—JP App 2021-129607, Eng Tran.

UP

RIGHT ⟵⟶ LEFT

DOWN

UP

FRONT ⟵⟶ REAR

DOWN

AIR PURIFIER

REFERENCE TO RELATED APPLICATION

This is a continuation application of International Application No. PCT/JP2021/010047 filed on Mar. 12, 2021, which claims priority from Japanese Patent Application No. 2020-167459 filed on Oct. 2, 2020. The entire contents of the aforementioned applications are incorporated herein by reference.

BACKGROUND

A known air purifier includes an air inlet, an air outlet and a blower, all of which are housed in a main body. The blower sucks air through the air inlet and discharges air through the air outlet.

DESCRIPTION

In an air purifier, there may be an option to have a larger diameter of a fan of the blower for increasing an amount of air sucked per unit time. However, as the diameter of the fan is greater, there is a problem that a size of the air purifier becomes larger.

An object of the present disclosure is to provide an air purifier capable of increasing the amount of air sucked per unit time while preventing the increase in size.

The air purifier according to one aspect of the present disclosure includes a housing having a cavity formed inside and having an inlet and an outlet, and two blowers and a filter provided in the housing. Each of the two blowers includes a fan that generates airflow by rotating, and an intake portion, that is located on an upstream side of the airflow, to suck air. Each of the two blowers, by rotating the fan, sucks air into the cavity through the inlet, flows the air sucked into the cavity toward the outlet, and exhausts the air through the outlet. Each of the two blowers passes air, that flows from the inlet to the outlet, through the filter. The intake portion of one blower is disposed to face the intake portion of the other blower. The inlet is located between one blower and the other blower in an opposing direction in which the two intake portions face each other. The inlet opens in a direction intersecting the opposing direction.

The air purifier according to another aspect of the present disclosure includes a housing having a cavity formed inside, the housing further having an inlet and an outlet, a first blower having a first fan located in the housing, a second blower having a second fan located in the housing, the second blower facing the first blower in an opposing direction, and a filter in the housing. The inlet is located between the first blower and the second blower in the opposing direction. The inlet opens in a direction intersecting the opposing direction. The first fan and the second fan generate airflow such that air flows into the cavity through the inlet, and flows from the cavity through the filter to the outlet.

The two blowers of the air purifier causes a greater amount of air sucked-in through the air inlet per unit time. Further, the two blowers are arranged so that the intake portions of the two blowers face each other. Therefore, the size of the housing of the air purifier can be reduced as compared with the case where the intake portions of the two blowers are arranged so as not to face each other. Therefore, the air purifier can suck the greater amount of air per unit time while keeping the smaller size of the housing.

OVERVIEW OF AIR PURIFIER 1A

Figure 1:
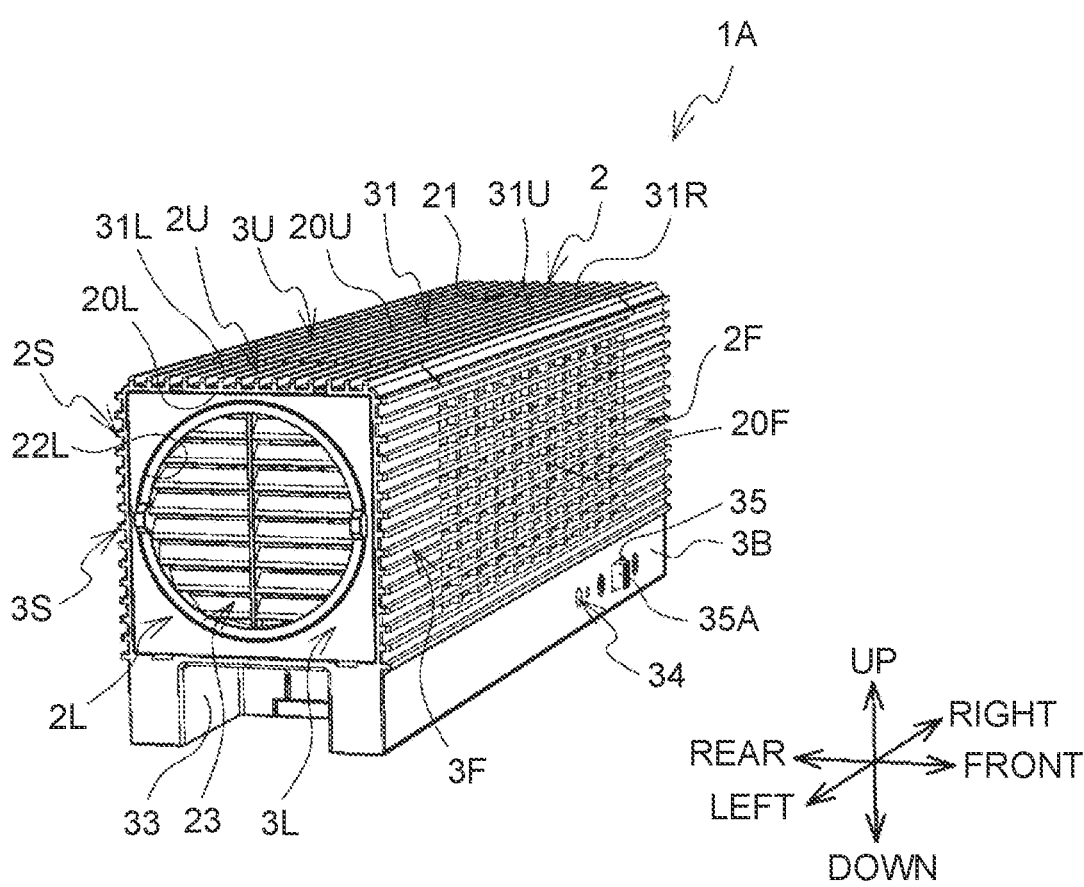
FIG. 1 is a perspective view of the air purifier 1A.

An air purifier 1A, which is an embodiment of the present invention, will be described. Upper, lower, right, left, lower left, and upper right of FIG. 1 are above, below, front, rear, left, and right of the air purifier 1A, respectively. The air purifier 1A sucks the surrounding air into the inside, purifies the air, and blows the purified air to the outside. The air purifier 1A includes a housing 2 (see FIGS. 1 to 6), a blower 5L, 5R (collectively referred to as "blower 5"; see FIGS. 7 and 9), and a filter 6 (see FIGS. 4, and 7 to 9) and a control board 9 (see FIG. 9).

<Housing 2>

As shown in FIGS. 1 to 6, a shape of the housing 2 is a substantially hexahedron, and more specifically, a substantially rectangular parallelepiped long in the left-right direction. The housing 2 has a base 3B, a front wall 3F, a rear wall 3S, a left wall 3L, a right wall 3R, and an upper wall 3U. The base 3B has a substantially box shape such that a space for accommodating the control board 9 (see FIG. 9) and the like is inside. The front wall 3F, the rear wall 3S, the left wall 3L, and the right wall 3R each have a plate shape and are connected to an upper wall 30 (see FIG. 9) of the base 3B. The front wall 3F, the rear wall 3S, the left wall 3L, and the right wall 3R extend upward from a front end portion, a rear end portion, a left end portion, and a right end portion of the upper wall 30 of the base 3B, respectively. The upper wall 3U has a plate shape and is connected to upper ends of the front wall 3F, the rear wall 3S, the left wall 3L, and the right wall 3R, respectively. An internal space surrounded by the front wall 3F, the rear wall 3S, the left wall 3L, the right wall 3R, the upper wall 3U, and the upper wall 30 of the base 3B is referred to as a cavity 10. A front surface 2F of the front wall 3F, a rear surface 2S of the rear wall 3S, a left surface 2L of the left wall 3L, a right surface 2R of the right wall 3R, an upper surface 2U of the upper wall 3U, and a bottom surface 2B of the base 3B corresponds to a surface of a front side, a rear side, a left side, a right side, an upper side, and a lower side among six surfaces of the housing 2.

Figure 2:
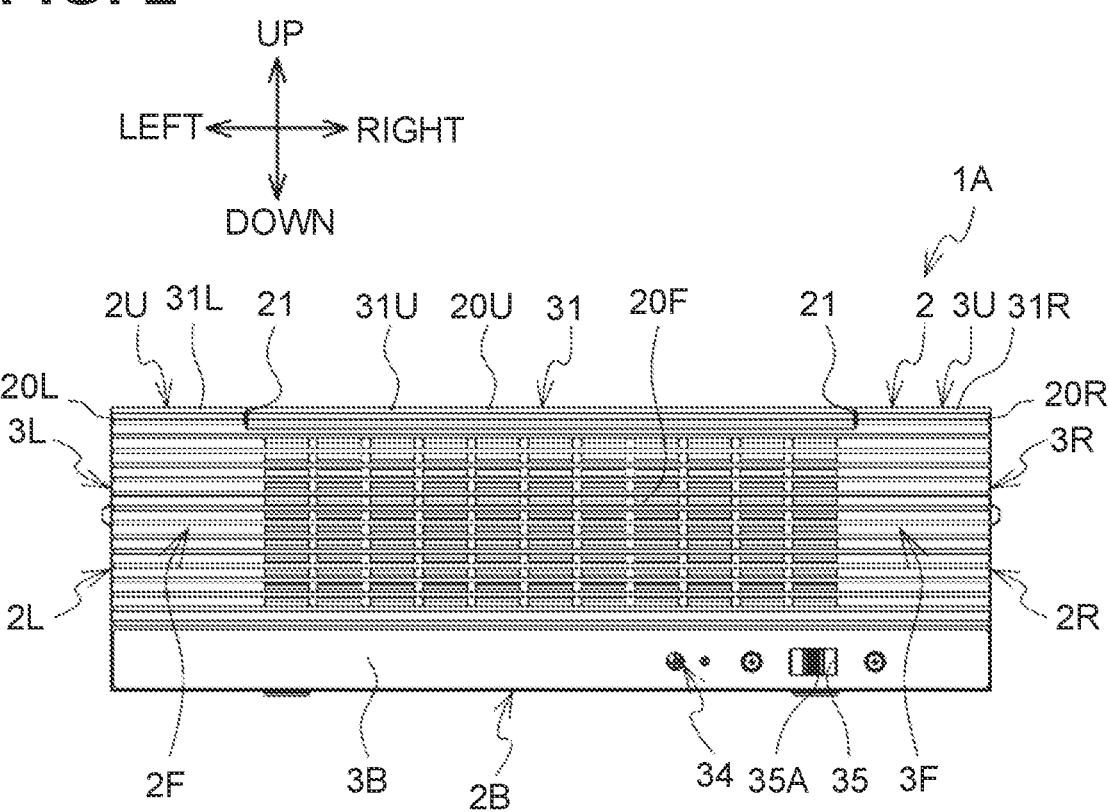
FIG. 2 is a front view of the air purifier 1A.
Figure 3:
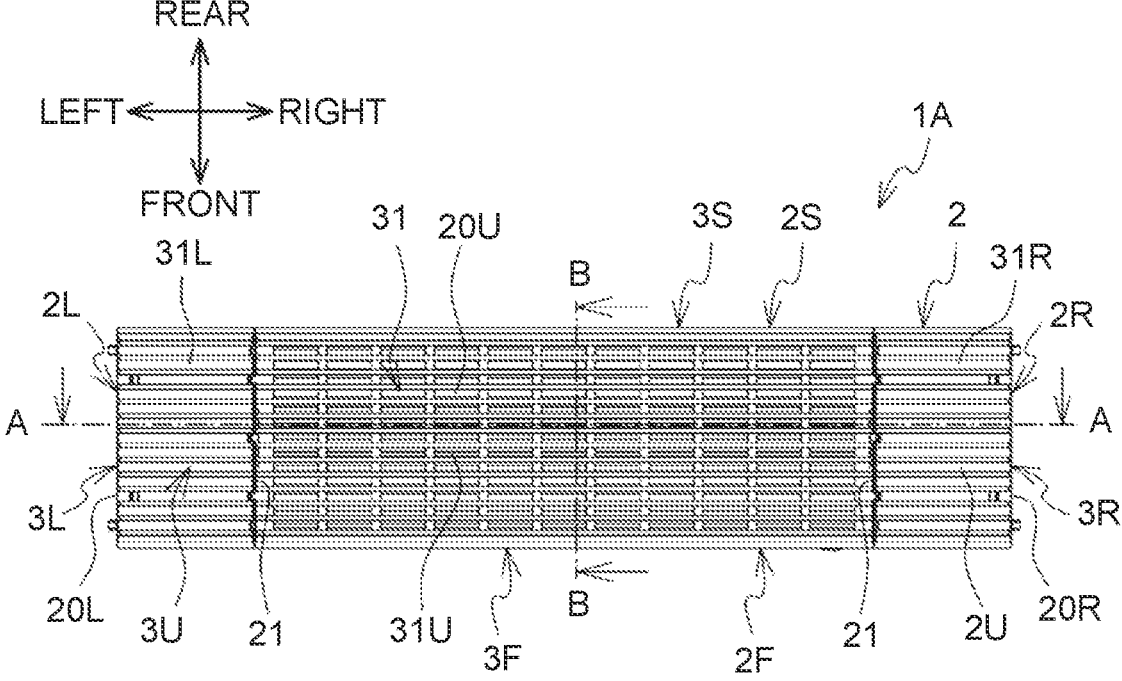
FIG. 3 is a top view of the air purifier 1A.
Figure 4:
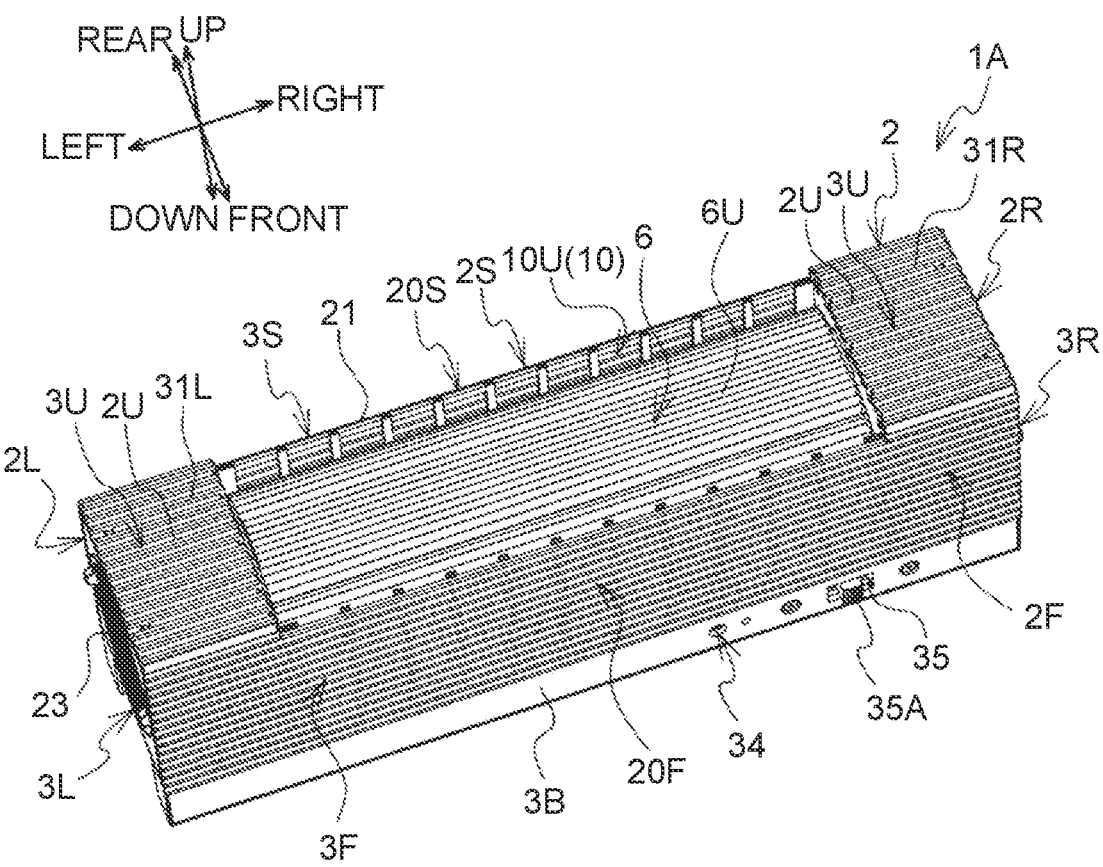
FIG. 4 is a perspective view of the air purifier 1A (with a filter 6) in which the lid 31 is detached.
Figure 5:
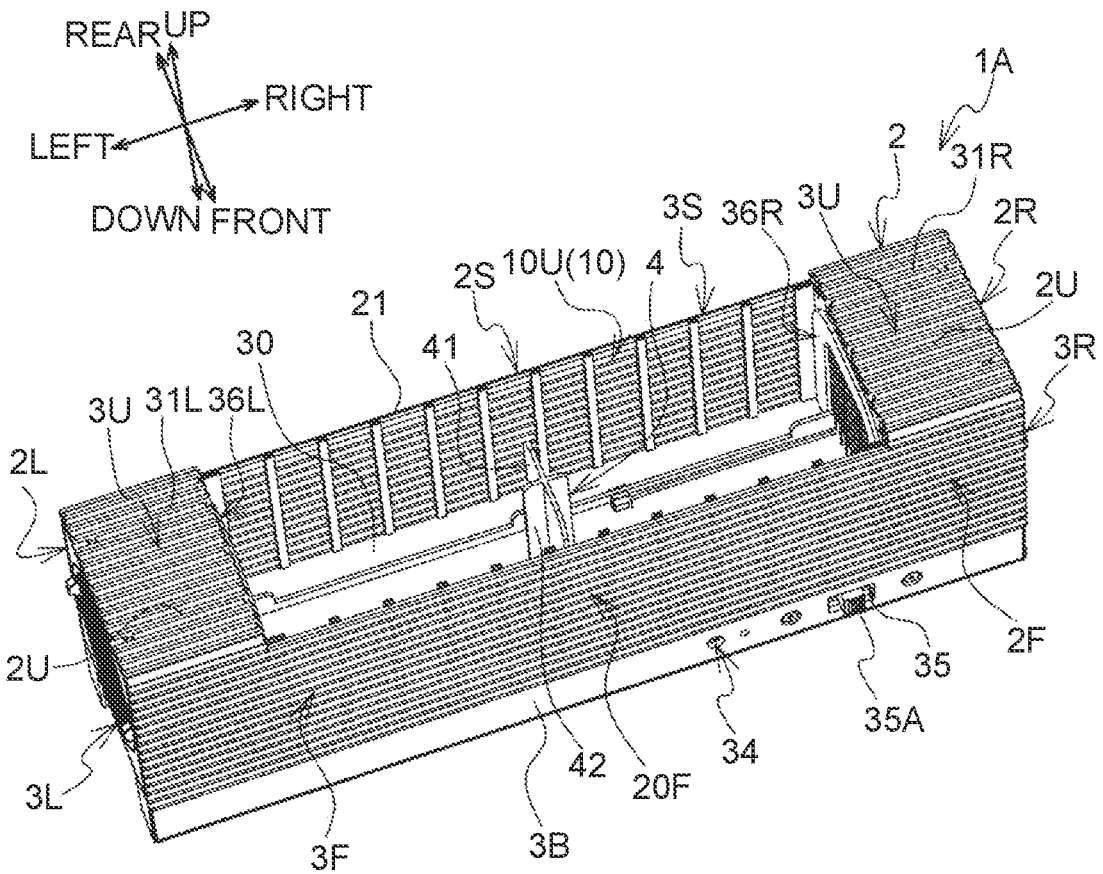
FIG. 5 is a perspective view of the air purifier 1A (without a filter 6) in which the lid 31 is detached.
Figure 6:
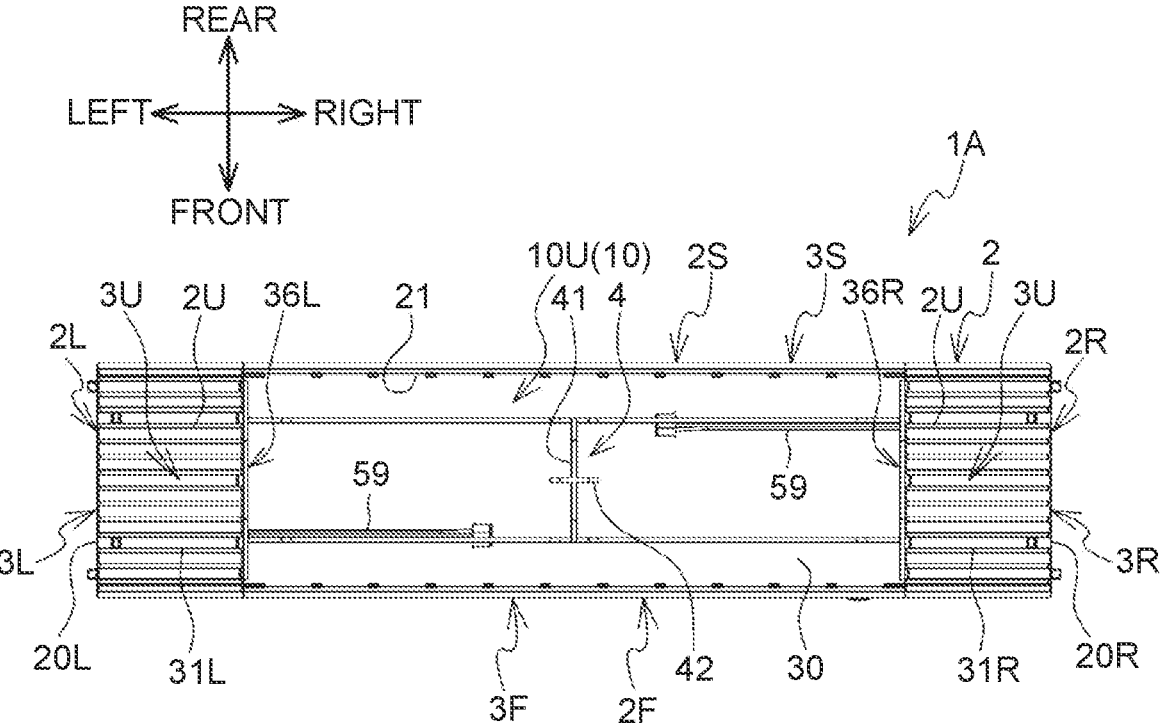
FIG. 6 is a top view of the air purifier 1A (without a filter 6) in which the lid 31 is detached.

As shown in FIGS. 1 to 3, the upper wall 3U includes an upper left wall 31L, an upper right wall 31R, and a lid 31. The upper left wall 31L is bridged between a left end of upper ends of the front wall 3F and the rear wall 3S and an upper end of the left wall 3L. The upper right wall 31R is bridged between a right end of upper ends of the front wall 3F and the rear wall 3S and an upper end of the right wall 3R. As shown in FIGS. 4 to 6, a right end of the upper left wall 31L, a left end of the upper right wall 31R, and upper ends of the front wall 3F and the rear wall 3S form a rectangular opening 21. As shown in FIGS. 1 to 3, the lid 31 can be attached to and detached from the upper surface 2U of the housing 2 to cover the opening 21. The lid 31 has a plate shape and closes the opening 21. Of the upper surface 2U of the housing 2, a portion corresponding to the lid 31 is referred to as an upper surface 31U.

Figures 7, 8:
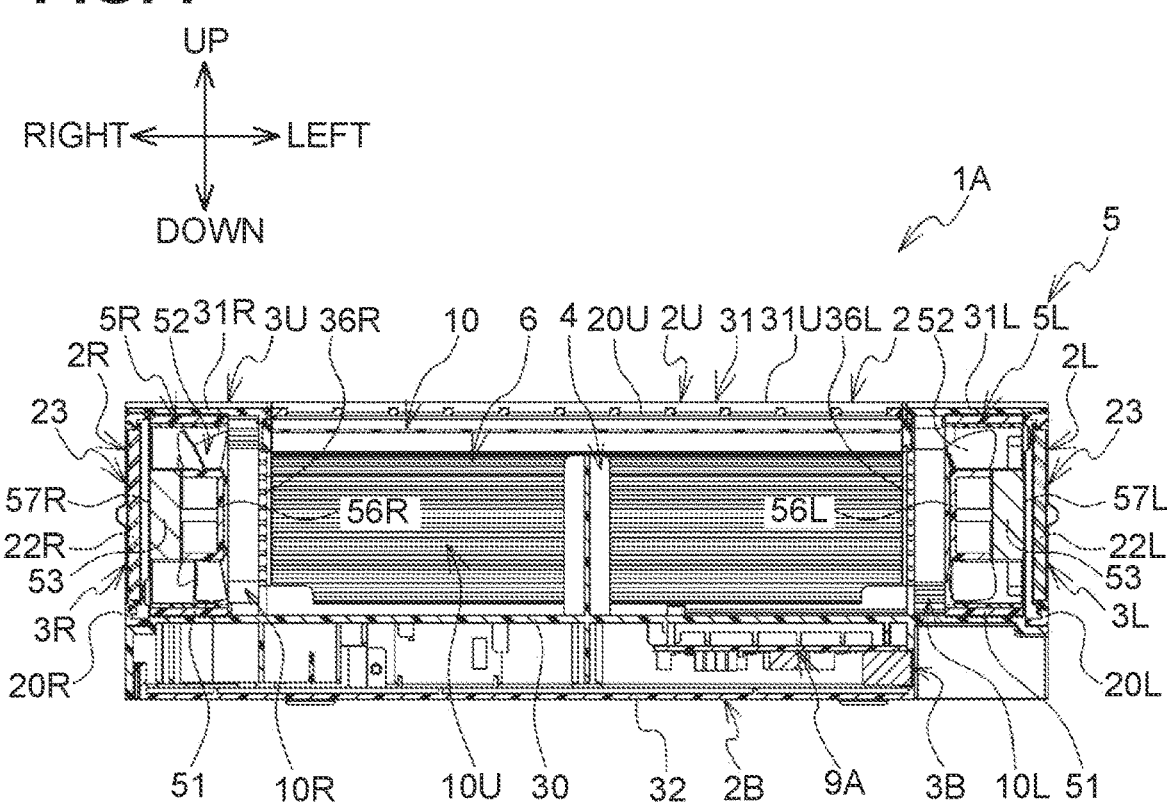
FIG. 7 is a cross-sectional view taken along the line A-A of FIG. 3 as viewed from the direction of the arrow.
FIG. 8 is a cross-sectional view taken along the line B-B of FIG. 3 as viewed from the direction of the arrow.

As shown in FIGS. 5 and 6, partition walls 36L, 36R are provided on the upper wall 30 of the base 3B. The partition wall 36L is provided below a left end of the opening 21. The partition wall 36R is provided below a right end of the opening 21. The partition walls 36L, 36R are orthogonal to the left-right direction. A plurality of slit-shaped through holes are formed in the partition walls 36L, 36R. As shown in FIG. 7, the partition walls 36L, 36R partition the cavity 10 into three portions (cavities 10U, 10L, 10R). The cavity 10L is a portion of the cavity 10 to the left of the partition wall 36L. The cavity 10R is a portion of the cavity 10 to the right of the partition wall 36R. The cavity portion 10U is a portion of the cavity 10 sandwiched between the partition walls 36L, 36R from the left-right direction, and is located below the lid 31 attached. The cavities 10U, 10L, 10R each accommodate the filter 6, and the blowers 5L, 5R, respectively, which will be described later (see FIG. 4). Note that the filter 6 (see FIG. 4) is not illustrated in FIGS. 5 and 6.

As shown in FIGS. 5 and 6, a partition 4 is provided on the upper wall 30 of the base 3B. The partition 4 is provided in the cavity 10U. The partition 4 has a first extension 41 and a second extension 42. The first extension 41 and the second extension 42 each have a plate shape and stand above the upper wall 30. The first extension 41 extends in the front-rear direction and is orthogonal to the left-right direction. The first extension 41 is located at a center of the housing 2 in the left-right direction, and partitions the cavity 10U in the left-right direction. A front end of the first extension 41 and the front wall 3F of the housing 2 are spaced away from each other, and a rear end of the first extension 41 and the rear wall 3S of the housing 2 are spaced away from each other. The second extension 42 is provided at a center of the first extension 41 in the front-rear direction. The second extension 42 extends in the left-right direction from the first extension 41 and is orthogonal to the front-rear direction. Lengths of the first extension 41 and the second extension 42 in the vertical direction are the same. The upper ends of the first extension 41 and the second extension 42 are spaced away from the lid 31.

Each of a plurality of spaces of the cavity 10U partitioned by the partition 4 communicates with each other at least in a part. In addition, in this embodiment, "partitioned" may include not only a case where a plurality of partitioned spaces communicate with each other at least in a part as described in this embodiment, but also a case where each of a plurality of partitioned spaces is completely enclosed.

As shown in FIG. 6, a length of the first extension 41 in the front-rear direction is approximately half of a distance in the front-rear direction between the front wall 3F and the rear wall 3S of the housing 2. The length of the first extension 41 in the front-rear direction is not limited to this embodiment, but it is preferable that the length is approximately half or more of the distance in the front-rear direction between the front wall 3F and the rear wall 3S. A distance between a front end of the first extension 41 and the front wall 3F, and a distance between a rear end of the first extension 41 and the rear wall 3S are approximately onequarter of the distance in the front-rear direction between the front wall 3F and the rear wall 3S, respectively, and is less than the length of the first extension 41 in the front-rear direction. A length of the second extension 42 in the left-right direction is approximately one-third of the length of the first extension 41 in the front-rear direction.

As shown in FIGS. 1 to 3, an air inlet 20U is formed on the upper surface 31U of the lid 31. An air inlet 20F is formed in a portion of the front surface 2F of the front wall 3F that overlaps with the opening 21 in the left-right direction. An air inlet 20S (see FIG. 4) is formed in a portion of the rear surface 2S of the rear wall 3S that overlaps with the opening 21 in the left-right direction. One of the upper surface 3U, the front surface 2F, and the rear surface 2S may be a third surface. That is, the air inlets 20U, 20F, 20S are provided on the front surface 2F, the upper surface 2U, and the rear surface 2S, which are adjacent to each other among six surfaces of the housing 2. The air inlets 20U, 20F, 20S each have a plurality of slit-shaped through holes. The air inlet 20U opens in the vertical direction, and the air inlets 20F, 20S open in the front-rear direction. Therefore, the air inlets 20U, 20F, 20S all open in the direction orthogonal to the left-right direction.

Figure 9:
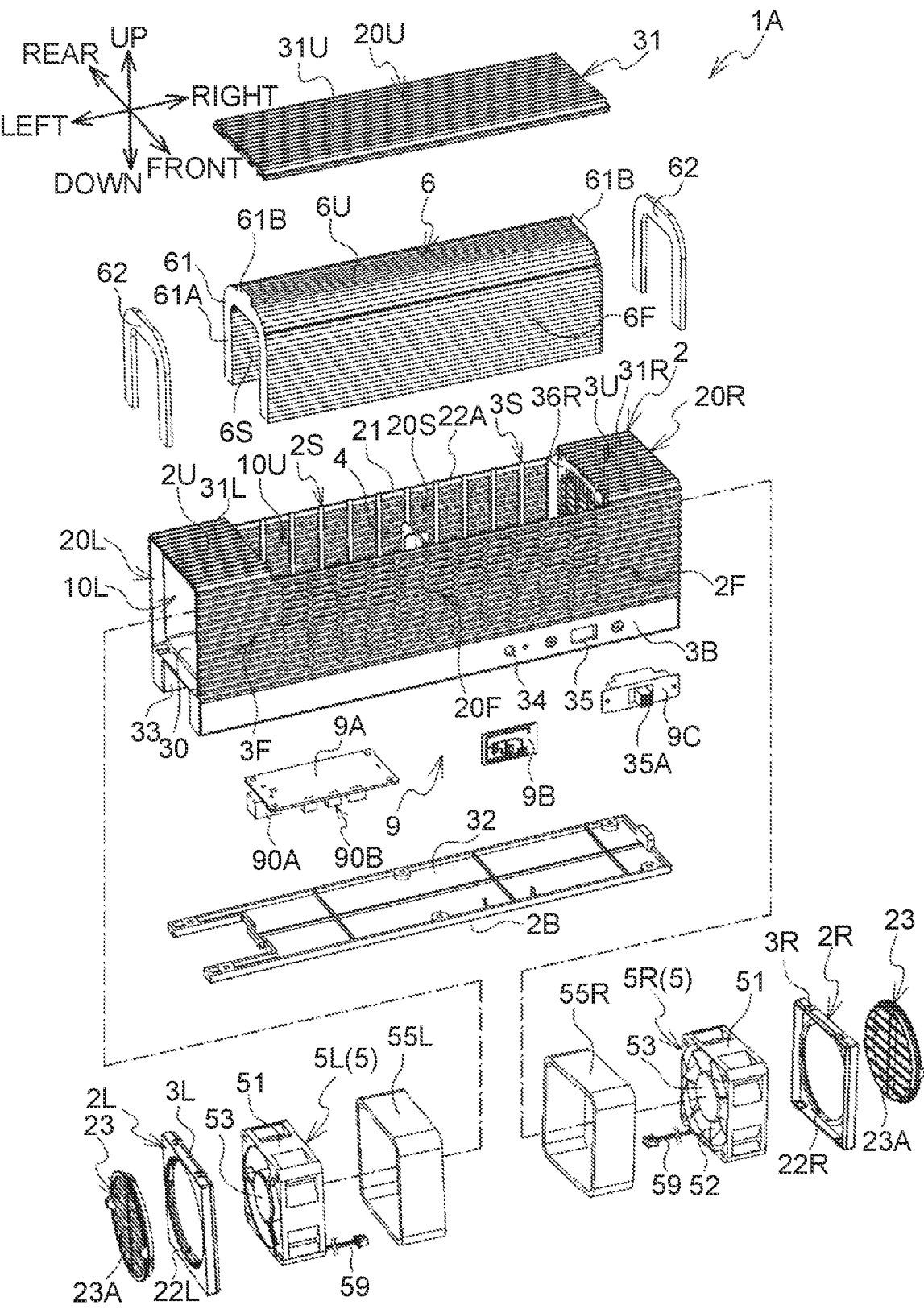
FIG. 9 is an exploded perspective view of the air purifier 1A.

As shown in FIG. 9, openings 20L, 20R are formed at each of left and right ends of the housing 2. The opening 20L is surrounded by left ends of the upper wall 3U, the front wall 3F, the rear wall 3S, and the upper wall 30 of the base 3B. The opening 20L communicates with the cavity 10L. The opening 20R is surrounded by right ends of the upper wall 3U, the front wall 3F, the rear wall 3S, and the upper wall 30 of the base 3B. The opening 20R communicates with the cavity 10R. The openings 20L, 20R face each other in the left-right direction.

The left wall 3L fits into the opening 20L, and the right wall 3R fits into the opening 20R. A circular-shape air outlet 22L is provided on the left surface 2L of the left wall 3L. The left surface 2K may be a first surface. A circular-shape air outlet 22R is provided on the right surface 2R of the right wall 3R. The right surface 2R may include a second surface. A louver 23 fits into each of the air outlets 22L, 22R. The louver 23 has a plurality of blades 23A arranged in parallel. The louver 23 changes the direction of air flowing through gaps between the plurality of blades 23A in a direction inclined with respect to the left-right direction. The louver 23 is rotatable with respect to the left wall 3L or the right wall 3R by sliding with respect to the air outlets 22L, 22R. The user can adjust the direction of air flowing from inside of the housing 2 to outside through the air outlets 22L, 22R by rotating the louver 23.

<Filter 6>

The filter 6 is a HEPA filter, which removes dust from air to purify the air. As shown in FIG. 8, the filter 6 has a structure in which a thick plate-shaped filter base having a pleated structure is bent. The cross-sectional shape when the filter 6 is cut in a plane orthogonal to the left-right direction is substantially U-shaped. As shown in FIGS. 8 and 9, the filter 6 has an upper portion 6U, a front portion 6F, and a rear portion 6S extending in the left-right direction. The upper portion 6U is orthogonal to the vertical direction. The front portion 6F extends downward from a front end of the upper portion 6U. The rear portion 6S extends downward from a rear end of the upper portion 6U. The front portion 6F and the rear portion 6S face each other in the front-rear direction. The downward direction with respect to the filter 6 is referred to as an opening direction of the filter 6.

The filter 6 is housed in the cavity 10U of the housing 2. The front portion 6F of the filter 6 is arranged on a rear side of the front wall 3F with respect to the portion where the air inlet 20F is formed. The rear portion 6S of the filter 6 is arranged on a front side of the rear wall 3S with respect to the portion where the air inlet 20S is formed. The upper portion 6U of the filter 6 is arranged below the lid 31 attached to the upper surface 2U of the housing 2. The partition 4 is arranged in a space surrounded by the upper portion 6U, the front portion 6F, and the rear portion 6S of the filter 6. As shown in FIG. 4, the filter 6 is exposed when the lid 31 is detached from the upper surface 2U of the housing 2. The user can take out the filter 6 from the cavity 10U through the opening 21.

As shown in FIG. 9, the filter 6 is provided with a thin plate-shaped shape-retaining member 61 made of a non-woven fabric at both ends in the left-right direction. The shape-retaining member 61 has a shape-retaining portion 61A and a grip portion 61B. The shape-retaining portion 61A has the same shape as the cross-sectional shape of the filter 6. The shape-retaining portion 61A is located at and adhered to each end of the filter 6 in the left-right direction of the filter 6 and retains the shape of the filter 6 so that the cross-sectional shape of the filter 6 is maintained in a U shape. The grip portion 61B extends from an upper end of the shape retaining portion 61A on the side opposite to the opening direction of the filter 6, that is, upwardly. The grip portion 61B projects upward from the upper end portion of the upper portion 6U of the filter 6. When the lid 31 is attached to the upper surface 2U of the housing 2, the grip portion 61B is bent to the side opposite to the filter 6 in the left-right direction and is housed in the cavity 10U. That is, the grip portion 61B is below the lid 31 attached to the upper surface 2U. The grip portion 61B is gripped when the user detaches the lid 31 from the upper surface 2U of the housing 2 and takes out the filter 6 from the cavity 10U.

Seal members 62 are provided at ends of the filter 6 in the left-right direction. More specifically, the seal member 62 is between the shape-retaining portion 61A of the shape-retaining member 61 provided at the left end of the filter 6 and the partition wall 36L, and is between the shape-retaining portion 61A of the shape-retaining member 61 provided at the right end of the filter 6 and the partition wall 36R. The sealing member 62 has the same cross-sectional shape as the filter 6, and is made of soft urethane foam. The seal member 62 fills a gap between the filter 6 (shape-retaining member 61) and the partition wall 36L in the left-right direction, and a gap between the filter 6 (shape-retaining member 61) and the partition wall 36R. By providing the seal member 62, suction efficiency of air through the filter 6 by the blowers 5L, 5R is improved.

<Blower 5>

As shown in FIG. 7, the blower 5 is an axial-flow blower. Blowers 5L, 5R are provided at each end of the housing 2 in the left-right direction, respectively. The blower 5L is located at one end of the housing 2. The blower 5R is located at the other end of the housing 2. The blower 5L is an example of a first blower. The blower 5R is an example of a second blower. More specifically, the blower 5L is fixed to the cavity 10L via a seal member 55L (see FIG. 9). The blower 5L is adjacent to the right side of the left wall 3L. The sealing member 55L is made of soft urethane foam and fills a gap between the upper left wall 31L, the front wall 3F, the rear wall 3S, and the upper wall 30 of the base 3B and a casing 51 of the blower 5L described later. The blower 5R is fixed to the cavity 10R via a seal member 55R (see FIG. 9). The blower 5R is adjacent to the left side of the right wall 3R. The seal member 55R is made of soft urethane foam and fills a gap between the upper right wall 31R, the front wall

3F, the rear wall 3S, and the upper wall 30 of the base 3B and a casing 51 of the blower 5R described later. By providing the sealing members 55L, 55R, suction efficiency of air through the filter 6 by the blowers 5L, 5R is improved. The filter 6 housed in the cavity 10U is located between the blower 5L and the blower 5R in the left-right direction. The air inlet 20U, 20F, 20S (see FIG. 9) of the housing 2 are arranged between the blowers 5L, 5R in the left-right direction.

As shown in FIGS. 7 and 9, each of the blowers 5L, 5R includes a casing 51, a fan 52, and a motor 53. The fan 52 of the blower 5L is an example of a first fan. The fan 52 of the blower 5R is an example of a second fan. The casing 51 has a square-tube shape. A through hole of the casing 51 extends in the left-right direction. The motor 53 is fixed to the vicinity of the center of the through hole of the casing 51. The rotation axis of the motor 53 extends in the left-right direction. The fan 52 is arranged inside the through hole of the casing 51 and is rotated with the motor 53.

The fan 52 generates airflow by rotation. The airflow generated by the fan 52 of the blower 5L passes through the through hole of the casing 51 of the blower 5L from right to left. As shown in FIG. 7, in the casing 51 of the blower 5L, a region surrounded by the right end portion of the through hole is referred to as an intake portion 56L, and a region surrounded by the left end portion is referred to as an exhaust portion 57L. The airflow generated by the fan 52 of the blower 5R passes through the through hole of the casing 51 of the blower 5L from left to right. Of the casing 51 of the blower 5R, a region surrounded by the left end portion of the through hole is referred to as an intake portion 56R, and a region surrounded by the right end portion is referred to as an exhaust portion 57R. The intake portions 56L, 56R are located on the upstream side of airflow with respect to the fan 52, and air is taken in. The intake portions 56L, 56R face each other in the left-right direction. The exhaust portions 57L, 57R are located on the downstream side of airflow with respect to the fan 52, and air is exhausted. The exhaust portion 57L is arranged so as to face the left surface 2L of the left wall 3L. The exhaust portion 57R is arranged so as to face the right surface 2R of the right wall 3R.

<Control Board 9>

As shown in FIG. 9, a lower wall 32 of the base 3B is removable. A control board 9 (a main board 9A and a LED board 9B) and a switch 9C are housed in an inner space of the base 3B. A control circuit, a USB connector 90A, a cable connector 90B, and the like are mounted on the main board 9A. A USB cable for supplying power to the air purifier 1A is connected to the USB connector 90A. The USB connector 90A is exposed from a recess 33 provided on a left side-surface of the base 3B. A cable 59 extending from the blowers 5L, 5R is connected to the cable connector 90B. An LED is mounted on the LED board 9B. The LED is exposed through a through hole 34 provided on a front surface of the base 3B. The switch 9C is a slide-switch. A knob 35A of the switch 9C projects forward through a through hole 35 provided on the front surface of the base 3B.

<Outline of Operation>

By connecting the USB cable to the USB connector 90A, the air purifier 1A is in a powered state. In this state, the user operates the knob 35A, and the air purifier 1A starts purifying air. The control circuit of the main board 9A drives each motor 53 of the blowers 5L, 5R, and rotates each fan 52. The blowers 5L, 5R each generate airflow flowing from the intake portions 56R, 56L toward the exhaust portions 57L, 57R. Due to the airflow, the air purifier 1A sucks air into the cavity 10U from the outside through the upper air inlet 20U, the front air inlet 20F, and the rear air inlet 20S of the housing 2. The sucked air passes through the filter 6 arranged inside the air inlets 20U, 20F, 20S and is purified. Further, the blowers 5L, 5R each flow the purified air in the cavity 10U from the intake portions 56L, 56R toward the exhaust portions 57L, 57R in the left or right direction. As a result, the purified air is blown out to the left through the air outlet 22L on the left side of the housing 2 and to the right through the air outlet 22R on the right side.

Function and Effect of this Embodiment

By providing the air purifiers 1A with the blowers 5L, 5R, an amount of air sucked through the air inlets 20U, 20F, 20S per unit time is greater as compared with the case where only one blower is provided. Further, in the blowers 5L, 5R, the intake portions 56R, 56L are arranged so as to face each other. Therefore, in the air purifier 1A, the size of the housing 2 can be less as compared with the case where the intake portions 56R, 56L of the blowers 5L, 5R are arranged so as not to face each other. Therefore, the air purifier 1A can suck more amount of air per unit time while preventing increase in size of the housing 2. In the air purifier 1A, the increase in size of the housing 2 in a radial direction of the fan 52 can be especially prevented.

In the air purifier 1A, the cavity 10U is partitioned in the left-right direction by the first extension 41 of the partition 4. In this case, in the air purifier 1A, influence of the airflow in the left-right direction in the cavity 10U by the opposing blowers 5L, 5R can be reduced. Therefore, the air purifier 1A can efficiently suck air through the air inlets 20U, 20F, 20S and blow out air through the air outlets 22L, 22R.

The partition portion 4 has the second extension 42 for partitioning the cavity 10U in the front-rear direction, in addition to the first extension 41 for partitioning the cavity 10U in the left-right direction. In this case, in the air purifier 1A, the air sucked through the opposing air inlets 20F, 20S is prevented from affecting each other in the cavity 10U. Further, in the air purifier 1A, by providing the second extension 42 in the center of the housing 2 in the front-rear direction, the air sucked through the air inlets 20F, 20S is evenly distributed in the cavity 10U and is flown in the left-right direction. Therefore, the air purifier 1A can further smooth the airflow in the left-right direction in the cavity 10U. Further, the second extension 42 can reinforce the first extension 41 and prevent the second extension 42 from falling in the left-right direction.

Blowers 5L, 5R are provided at ends of the housing 2 in the left-right direction. In this case, the air purifier 1A can have the maximum space in which the filter 6 provided between the blowers 5L, 5R can be arranged in the left-right direction. Therefore, since the air purifier 1A can accommodate a large filter 6, the air can be efficiently purified with the filter 6.

The air purifier 1A has the air inlets 20U, 20F, 20S on the upper surface 2U, the front surface 2F, and the rear surface 2S, which have a relatively large area among the six surfaces of the rectangular parallelepiped housing 2 that is long in the left-right direction. In this case, since the air purifier 1A has a large area of the air inlets 20U, 20F, 20S, the amount of air sucked through the air inlets 20U, 20F, 20S per unit time can be more. Further, in the air purifier 1A, the air inlets 20U, 20F, 20S are arranged on a plurality of surfaces (upper surface 2U, front surface 2F, rear surface 2S) of the four surfaces, excluding the left surface 2L and the right surface 2R, of the housing 2. Because of this configuration, the air purifier 1A efficiently sucks air not only in one direction but also in multiple directions with respect to the housing 2 and purifies the air.

The blowers 5L, 5R are axial-flow blowers, and the rotation shafts of the respective motors 53 extend in the left-right direction. In this case, the air purifier 1A directs the air blown by the blowers 5L, 5R through the air outlets 22L, 22R to a direction (the left-right direction) orthogonal to the opening directions (upward, forward, backward) of the air inlets 20U, 20F, 20S. Therefore, the air purifier 1A can reduce possibility that the air blown out through the air outlets 22L, 22R is sucked in again through the air inlets 20U, 20F, 20S.

The louver 23 can change the direction of the air blown out through the air outlets 22L, 22R in a direction inclined with respect to the left-right direction. Therefore, the user can adjust the direction of the air blown out through the air outlets 22L, 22R to a desired direction by rotating the louver 23.

The shape-retaining member 61 retains the shape of the filter 6 so that the cross-sectional shape of the filter 6 is maintained in the U-shape. The upper portion 6U, the front portion 6F, and the rear portion 6S of the U-shaped filter 6 are in close proximity to each of the air inlets 20U, 20F, 20S. Therefore, the air purifier 1A can purify the air sucked through each of the air inlets 20U, 20F, 20S with the filter 6 in common. Further, the user can replace the filter 6 (upper portion 6U, front portion 6F, rear portion 6S) corresponding to the air inlets 20U, 20F, 20S by performing one operation of attaching and detaching the filter 6. Therefore, the maintainability of the air purifier 1A can be improved. Further, since the user can grip the grip portion 61B of the filter 6 to perform the attachment/detachment operation of the filter 6, it is possible to prevent the user from directly touching the filter 6 and it is hygienic.

<First Modification>

A first modification will be described with reference to FIG. 10. In an air purifier 1B according to the first modification, the shape of the partition 4B is different from that of the partition 4 of the air purifier 1A. Other configurations of the air purifier 1B are the same as those of the air purifier 1A.

Figure 10:
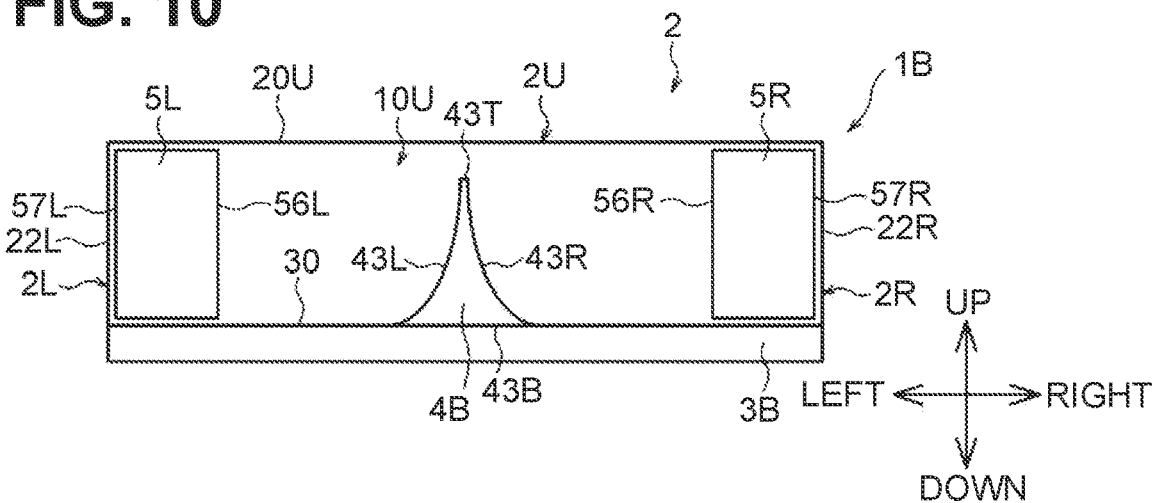
FIG. 10 is a drawing that shows the air purifier 1B in the first modification.

As shown in FIG. 10, a left surface 43L of the partition 4B of the air purifier 1B is curved and extends diagonally downward to the left from an upper end 43T toward a lower end 43B of the partition 4B. A right surface 43R of the partition 4B of the air purifier 1B is curved and extends diagonally downward to the right from the upper end 43T toward the lower end 43B of the partition 4B. The inclination of the left surface 43L and the right surface 43R increases from the lower end 43B toward the upper end 43T.

In the air purifier 1B, due to the inclined and curved left surface 43L and right surface 43R of the partition portion 4B with respect to the vertical direction, the air sucked through the air inlet 20U of the upper surface 2U of the housing 2 flows smoothly toward the air outlet 22L of the left surface 2L and the air outlet 22R on the right surface 2R.

<Second Modification>

A second modification will be described with reference to FIG. 11. An air purifier 1C according to the second modification further includes blowers 7L, 7R, and the shape of a partition 4C is different from that of the air purifier 1A. Other configurations of the air purifier 1C are the same as those of the air purifier 1A.

Figure 11:
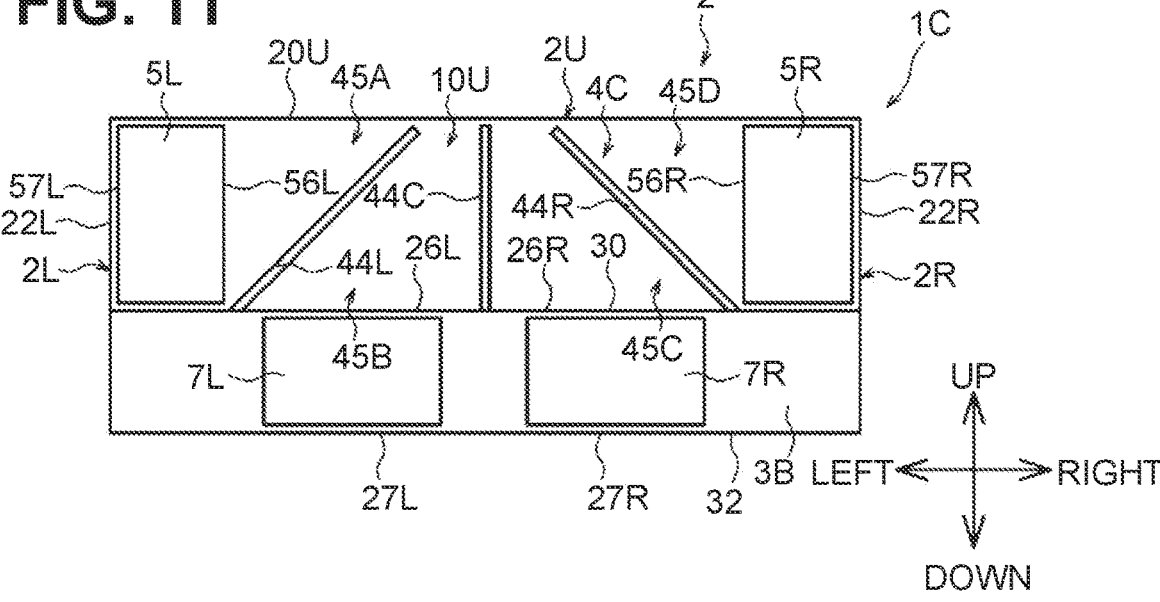
FIG. 11 is a drawing that shows the air purifier 1C in the second modification.

As shown in FIG. 11, the air purifier 1C includes a partition 4C. The partition 4C has a central extension 44C, a left extension 44L, and a right extension 44R. The central extension 44C, the left extension 44L, and the right extension 44R each extend in the front-rear direction. The central extension 44C stands upward from a center of the upper wall 30 in the left-right direction, and partitions the cavity 10U in the left-right direction. The left extension 44L stands diagonally upward to the right from the vicinity of the right side of the blower 5L in the upper wall 30. The left extension 44L partitions a space of the cavity 10U on the left side of the central extension 44C in the left-right direction. The right extension 44R stands diagonally upward to the left from the vicinity of the left side of the blower 5R in the upper wall 30, and partitions a space of the cavity 10U on the right side of the central extension 44C in the left-right direction. Upper ends of the central extension 44C, the left extension 44L, and the right extension 44R are not connected and are separated in the left-right direction. Further, the upper ends of the central extension 44C, the left extension 44L, and the right extension 44R are downwardly away from the upper wall 3U of the housing 2.

Hereinafter, four spaces of the cavity 10U partitioned by the central extension 44C, the left extension 44L, and the right extension 44R are referred to as divided cavities 45A, 45B, 45C, 45D. Portions of the air inlets 20U, 20F, 20S communicating with the divided cavities 45A, 45B, 45C, 45D are a first partial air inlet, a second partial air inlet, a third partial air inlet, and a fourth partial air inlet, respectively.

The blower 5L sucks air into the divided cavity 45A through the first partial air inlet. The air passes through the filter 6 in a process of being sucked into the split cavity 45A and is purified. Further, the blower 5L blows the purified air in the divided cavity 45A to the left through the air outlet 22L on the left side of the housing 2. Further, the blower 5R sucks air into the divided cavity 45D through the fourth partial air inlet. The air passes through the filter 6 in a process of being sucked into the divided cavity 45D and is purified. Further, the blower 5R blows the purified air in the divided cavity 45D to the right through the outlet 22R on the right side of the housing 2.

The air purifier 1C further includes the blowers 7L, 7R. The blower 7L is fixed in the base 3B and below the divided cavity 45B. An opening 26L is provided above the blower 7L in the upper wall 30, and an air outlet 27L is provided below the blower 7L in the lower wall 32 of the base 3B. The blower 7R is fixed in the base 3B and below the divided cavity 45C. An opening 26R is provided above the blower 7R in the upper wall 30, and an air outlet 27R is provided below the blower 7R in the lower wall 32 of the base 3B.

The blower 7L sucks air into the divided cavity 45B through the second partial air inlet. The air passes through the filter 6 in a process of being sucked into the divided cavity 45B and is purified. Further, the blower 7L blows the purified air in the divided cavity 45B downward through the opening 26L and the air outlet 27L of the housing 2. Further, the blower 7R sucks air into the divided cavity 45C through the third partial air inlet. The air passes through the filter 6 in the process of being sucked into the divided cavity 45C and is purified. Further, the blower 7R blows the purified air in the divided cavity 45C downward through the opening 26R and the air outlet 27R of the housing 2.

As described above, since the air purifier 1C has four blowers (blowers 5L, 5R, 7L, 7R), an amount of air sucked from the air inlets 20U, 20F, 20S per unit time is greater as compared with the air purifiers 1A, 1B. Further, the air purifier 1C can flow the air through the divided cavities 45A-45D by driving the blowers 5L, 5R, 7L, 7R. In this case, the partition 4C can prevent the air flowing through the cavity 10U according to the drive of the blowers 5L, 5R, 7L, 7R from affecting each other. Therefore, the air purifier 1C can improve the efficiency of purifying the air by smoothly flowing the air in the cavity 10U.

In the second modification, the upper ends of the central extension 44C, the left extension 44L, and the right extension 44R may be connected to each other. Further, in this state, the upper ends of the central extension 44C, the left extension 44L, and the right extension 44R may each come into contact with the lid 31.

<Third Modification Example>

Figure 12:
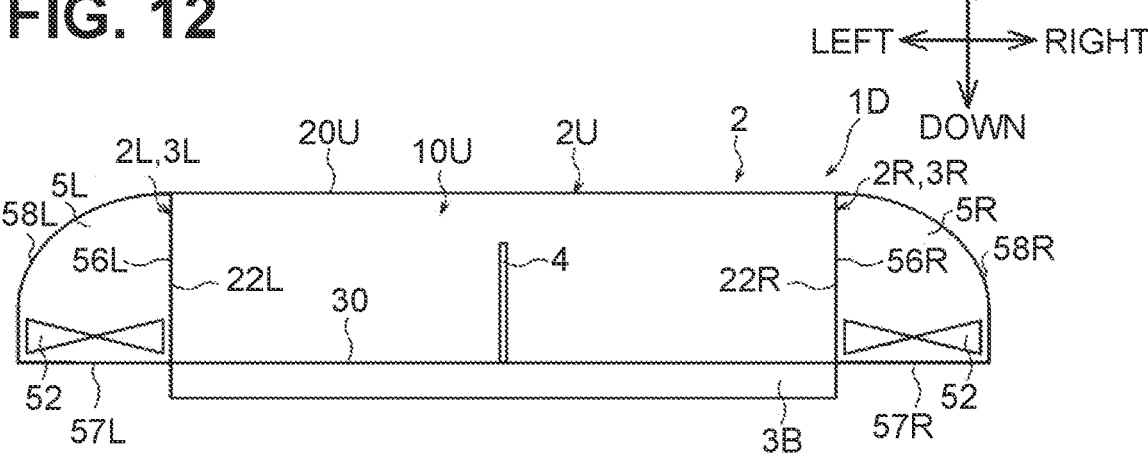
FIG. 12 is a drawing that shows the air purifier 1D in the third modification.

A third modification will be described with reference to FIG. 12. In an air purifier 1D according to the third modification, the blower 5L has a duct 58L, and the blower 5R has a duct 58R. The ducts 58L, 58R each have a bent tubular shape and have two openings.

The intake portion 56L of the blower 5L corresponds to one of the openings of the duct 58L and opens toward the right. The intake portion 56L faces the left surface 2L of the left wall 3L of the housing 2 and is connected to the air outlet 22L. The exhaust portion 57L of the blower 5L corresponds to the other of the openings of the duct 58L and is arranged to the left of the intake portion 56L. The exhaust portion 57L opens downward. The fan 52 of the blower 5L is arranged in the vicinity of the exhaust portion 57L, and air flows from the inside of the duct 58L to the outside. The air is exhausted downward through the exhaust portion 57L of the blower 5L.

The intake portion 56R of the blower 5R corresponds to one of the openings of the duct 58R and opens toward the left. The intake portion 56R faces the right surface 2R of the right wall 3R of the housing 2 and is connected to the air outlet 22R. The intake portion 56L of the blower 5L and the intake portion 56R of the blower 5R face each other in the left-right direction. The exhaust portion 57R of the blower 5R corresponds to the other of the openings of the duct 58R and is arranged to the right of the intake portion 56R. The exhaust portion 57R opens downward. The fan 52 of the blower 5R is arranged in the vicinity of the exhaust portion 57R, and air flows from the inside of the duct 58R to the outside. The air is exhausted downward through the exhaust portion 57R of the blower 5R.

The blowers 5L, 5R generate airflow from the intake portions 56L, 56R toward the exhaust portions 57L, 57R. Due to the airflow, the air purifier 1D sucks air into the cavity 10U from the outside through the air inlets 20U, 20F, 20S of the housing 2. The sucked air passes through the filter 6 and is purified. Further, the blowers 5L, 5R flow the purified air in the cavity 10U from the intake portions 56L, 56R toward the exhaust portions 57L, 57R via the ducts 58L, 58R. As a result, the purified air is blown downward through the exhaust portions 57L, 57R of the blowers 5L, 5R.

<Fourth Modification>

Figure 13:
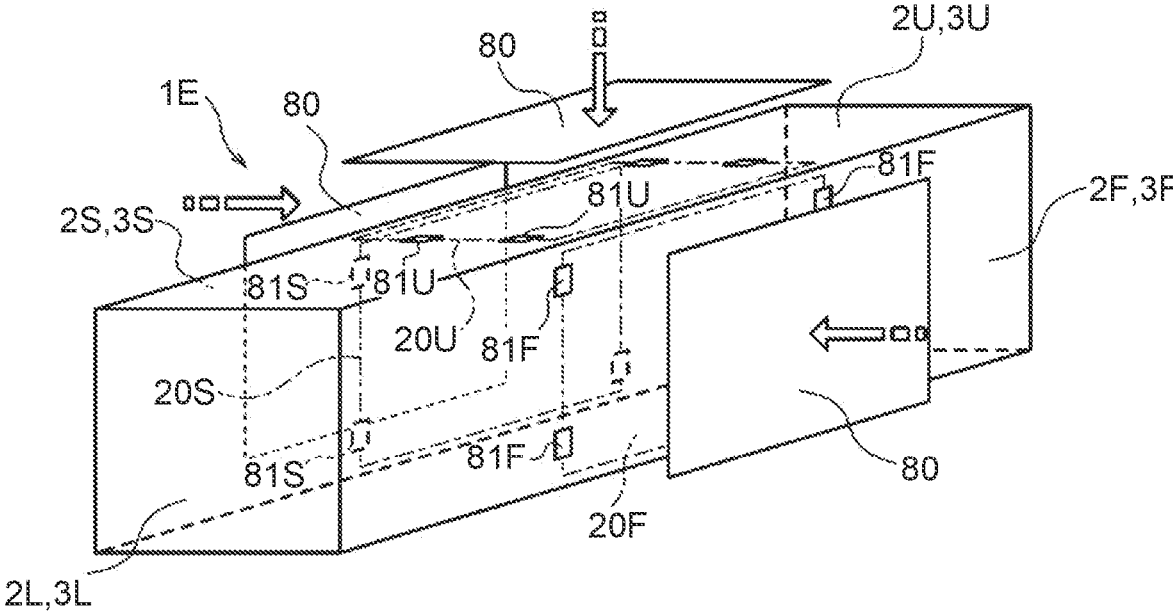
FIG. 13 is a drawing that shows the air purifier 1E in the fourth modification.

A fourth modification will be described with reference to FIG. 13. An air purifier 1E according to the fourth modification includes a closing mechanism 81U for closing the air inlet 20U on the upper surface 2U of the upper wall 3U, a closing mechanism 81F for closing the air inlet 20F on the front surface 2F of the front wall 3F, and a closing mechanism 81S for closing the air inlet 20S on the rear surface 2S of the rear wall 3S. The closing mechanisms 81U, 81F, 81S are hooks such that a closing plate 80 can be attached to the housing 2. When the closing plate 80 is attached to the closing mechanism 81U, the air inlet 20U is closed with the closing plate 80. When the closing plate 80 is attached to the closing mechanism 81F, the air inlet 20F is closed with the closing plate 80. When the closing plate 80 is attached to the closing mechanism 81S, the air inlet 20S is closed with the closing plate 80.

For example, a user of the air purifier 1E may close some of the air inlets 20U, 20F, 20S with the closing plate 80 depending on use. In this case, the user can prevent air from being sucked into the air purifier 1E through the particular air inlet. In addition, in the air purifier 1E the user can increase an amount of air per unit time sucked through the air inlet that is not closed.

<Other Modifications>

The present invention can be modified in various ways. Hereinafter, unless otherwise specified, a modified example will be described by taking the air purifier 1A as an example, but the modified example may be appropriately applied to the air purifier 1B to 1E.

The air purifier 1A may be used in a state where a direction in which the left wall 3L faces the right wall 3R is parallel to the vertical direction. For example, the air purifier 1A may be used by fixing the base 3B to a microphone stand such that a longitudinal direction of the housing 2 is parallel to the microphone stand. The shape of the housing 2 is not limited to the rectangular parallelepiped shape. For example, the housing 2 may be a long cylinder or prism (triangular prism or the like) in the left-right direction. The number of blowers 5 is not limited to two (air purifiers 1A, 1B, 1D, 1E) or four (air purifier 1C), and may be three or five or more.

The front end of the first extension 41 of the partition 4 may contact the front wall 3F of the housing 2. The rear end of the first extension 41 may contact the rear wall 3S of the housing 2. The upper end of the first extension 41 may contact the upper wall 3U of the housing 2. In this case, the cavity 10U may be divided in the left-right direction by the first extension 41. The air inlets 20U, 20F, 20S may be provided for each divided space. The air purifier 1A may not have the partition 4.

The left and right ends of the second extension 42 of the partition 4 may contact the left wall 3L and the right wall 3R of the housing 2, respectively. The upper end of the second extension 42 may contact the upper wall 3U of the housing 2. In this case, the cavity 10U may be divided in the front-rear direction by the second extension 42. The air inlet 20U may be provided for each divided space. The partition 4 may have only the first extension 41 and may not have the second extension 42. The first extension 41 and the second extension 42 may be cylindrical or prismatic instead of plate-shape.

The intake portion 56L of the blower 5L and the intake portion 56R of the blower 5R may not face each other in the left-right direction. For example, only a part of each of the intake portions 56L, 56R may face each other in the left-right direction. The blower 5L may be fixed to the left side of the left wall 3L of the housing 2. In this case, the intake portion 56L of the blower 5L and the left surface 2L of the housing 2 may face each other in the left-right direction. Similarly, the blower 5R may be fixed to the right side of the right wall 3R of the housing 2. In this case, the intake portion 56R of the blower 5R and the right surface 2R of the housing 2 may face each other in the left-right direction. The filter 6 may be provided on the downstream of the airflow with respect to the exhaust portions 57L, 57R of the blowers 5L, 5R. In this case, the filter 6 may not be provided between the blowers 5L, 5R in the left-right direction.

The air inlet may be provided on the bottom surface 2B of the base 3B in addition to the upper surface 2U, the front surface 2F, and the rear surface 2S. The air inlet may be provided on any one or two of the upper surface 2U, the front surface 2F, the rear surface 2S, and the bottom surface 2B of the housing 2. For example, the air purifier 1A may have only the air inlet 20F on the front surface 2F and the air inlet 20S on the rear surface 2S, and may not have the air inlet 20U on the upper surface 2U and the air inlet on the bottom surface 2B.

The rotation axis of the motor 53 of the blower 5 may extend in a direction inclined with respect to the left-right direction. The blower 5 may be rotatably provided with respect to the housing 2. The user may adjust the direction of the blown air by rotating the blower 5 itself. The blower 5 is not limited to the axial-flow blower, and may be either a mixed flow blower or a centrifugal blower. The lid 31 may be detachably provided on the front wall 3F or the rear wall 3S of the housing 2. The cross-sectional shape of the filter 6 is not limited to the U-shape, and other cross-sectional shapes may be used. For example, in the filter 6, the cross-sectional shapes of the upper portion 6U, the front portion 6F, and the rear portion 6S may extend linearly, and the cross-sectional shapes of the connecting portion between the upper portion 6U and the front portion 6F and the connecting portion between the upper portion 6U and the rear portion 6S may be angular (U-shaped). In the filter 6, the upper portion 6U, the front portion 6F, and the rear portion 6S may be formed separately.

<Others>

The left-right direction is an example of "opposing direction". The front-rear direction is an example of the "intersecting direction". The air inlet 20U of the lid 31 is an example of the "detachable inlet".

An air purifier having a cavity inside the housing includes two blowers arranged in the cavity and a filter arranged in the cavity. The housing includes an air inlet and an air outlet. The outlets are provided at both ends of the cavity, and two partitions are provided to partition the cavity extending from one outlet to the other into three cavities. Each partition is provided with a through hole through which air in the cavity flows. A wall that surrounds a central cavity of the three cavities, which is sandwiched between the partition walls, includes the air inlet. In the central cavity is accommodated the filter. The two blowers that discharge the air in the central cavity to the outside of the housing through the air outlet are provided in each of the cavities at both ends of the three cavities. The air suction side of each blower is arranged on the partition wall side that defines the central cavity.

The air purifier can suck more amount of air per unit time while preventing the increase in size.

The filter is detachably housed in the central cavity. The housing includes an opening through which a filter housed in the central cavity is exposed. The housing includes a lid that closes the opening and allows the opening to be opened when the filter is attached or detached.

The air purifier can be easily maintained because the user can open the opening and remove and replace the dirty filter as needed.

The housing has a rectangular parallelepiped shape, and the air outlets are provided on a pair of side surfaces of the rectangular parallelepiped shape in the lateral direction. The air inlet is provided on each of a plurality of surfaces along the longitudinal direction of the rectangular parallelepiped housing.

The air purifier has a rectangular parallelepiped housing and has air inlets on a plurality of surfaces along the longitudinal direction, so that the area of the air inlet can be enlarged. In addition, since the amount of air sucked in through the air inlets per unit time can be greater, the air can be efficiently purified.

The louver equipped with the blades for changing the direction of the air blown by the blower is rotatably provided at the air outlet.

The air purifier allows the user to adjust the direction of the air blown out from the inside of the housing through the air outlet by rotating the louver.

A seal member is provided to fill the gap between the filter and the partition wall housed in the central cavity.

The air purifier is provided with the seal member, so that the efficiency of sucking air through the filter by the blower is improved.

The housing has a rectangular parallelepiped shape, and includes a base, a front wall and a rear wall extending upward from the base and extending in the longitudinal direction, a left wall and a right wall extending upward from the base and extending in the lateral direction, and an upper wall connected to the upper ends of the front wall, the rear wall, the left wall and the right wall. The air inlets are provided on the front wall, the rear wall, and the upper wall, respectively. The air outlet is provided on the left wall and the right wall. The filter includes the front portion facing the front wall, the rear portion facing the rear wall, and the upper portion facing the upper wall, and the upper end portion of the front portion and the upper end portion of the rear portion are connected via the upper portion.

The air purifier can efficiently suck air through the air inlets of the front wall, the rear wall, and the upper wall of the housing. The filter has the front portion facing the front wall of the housing, the rear portion facing the rear wall of the housing, and the upper portion facing the upper wall of the housing such that the air is efficiently purified because of the front portion, rear portion and the upper portion of the filter.

The grip portion is provided on the upper portion of the filter.

The air purifier allows the user to replace the filters (upper portion, front portion, rear portion) corresponding to each of the multiple air inlets by one operation of attaching and detaching the filter. Therefore, the maintainability of the air purifier can be improved. Further, since the user can grip the grip portion of the filter to attach and detach the filter, it allows the user to not directly touch the filter, whereby it is hygienic.

The seal member is provided to fill the gap between the blower and the upper wall, the gap between the blower and the front wall, the gap between the blower and the rear wall, and the gap between the blower and the base.

The air purifier is provided with the sealing member, so that the suction efficiency through the filter by the blower is improved.

In the air purifier having the cavity inside the housing, the filter is arranged between two blowers arranged in the cavity.

The air purifier can suck more amount of air per unit time while preventing the increase in size.

The filter extends along the longitudinal direction of the housing, the two blowers are axial-flow blowers that rotate a fan, and the rotation axes of the two blowers extend in the longitudinal direction.

The housing has two partitions that partition the internal cavity into three cavities along the left-right direction. The two blowers are arranged in the cavities at both ends of the three cavities.

The filter is made of the filter base having the pleated structure. The filter base includes the upper portion, the front portion that bends downward from the front end of the upper portion, and the rear portion that bends downward from the rear end of the upper portion and faces the front portion. The shape-retaining portions are provided on both ends of the upper portion, the front portion, and the rear portion, respectively, and the shape-retaining portion holds the bent state of the upper portion, the front portion, and the rear portion.

The filter can be easily replaced through the replacement opening. The filter can purify air at each part while maintaining the bent shape of the upper portion, the front portion and the rear portion, and since these are integrated into a single component, it can be easily replaced and miniaturized.

The housing is provided with the replacement opening that opens the cavity such that the filter is exposed. The upper portion of the filter base is arranged to face the replacement opening.

The user can take out the filter from the cavity through the opening.

The shape-retaining portion is provided with the grip portion on the upper portion of the filter base.

Since the user grabs the grip portion, the user can replace the filter without touching the filter base.

The grip portion can be bent between a state in which the grip portion extends upward from the upper portion of the filter base and a state in which the grip portion extends laterally from the upper portion of the filter base.

Since the grip portion can be bent to the side of the filter base, the grip portion may not get dirty and the fingers of the user can be kept clean.

The seal member is provided for each of the shape-retaining portions.

Since the seal member is provided, the air before purified does not enter the exhaust side, and only the air that has passed through the filter base can be exhausted.

The filter includes the filter base having the pleated structure. The filter base includes the upper portion, the front portion that bends downward from the front end of the upper portion, and the rear portion that bends downward from the rear end of the upper portion and faces the front portion. Shape-retaining portions are provided on both ends of the upper portion, the front portion, and the rear portion. The shape-retaining portion holds the bent state of the upper portion, the front portion, and the rear portion, and each of the shape-retaining portions is provided with the sealing member.

Air can be purified in each portion of the filter while maintaining that the upper portion, the front portion and the rear portion of the filter are bent. Since the upper portion, the front portion and the rear portion are in a single piece, both easiness of filter replacement and miniaturization of the filter are achieved. Since the sealing member is provided, the air before purified does not enter the exhaust side, and only the air that has passed through the filter base can be exhausted.

The filter base has two bent portions, one of the two bent portions connects the upper portion and the front portion, and the other bent portion connects the upper portion and the rear portion. The arrangement of folds of the filter along the outer edge of the filter is such that spacing of the folds at the bend is greater than spacing of the folds at the upper portion, spacing of the folds at the front portion, and spacing of the folds at the rear portion.

The filter base has two bent portions. One of the two bent portions connects the upper portion and the front portion, and the other of the two bent portions connects the upper portion and the rear portion. At the two bends, the spacing between the folds on the outer edge of the filter is greater than the spacing between the folds on the inner edge of the filter.

What is claimed is:

1. An air purifier comprising:

a housing having a cavity formed inside and having an inlet and an outlet; and two blowers and a filter provided in the housing, wherein each of the two blowers includes a fan that generates airflow by rotating, and an intake portion, that is located on an upstream side of the airflow, to suck air, wherein each of the two blowers, by rotating the fan, sucks air into the cavity through the inlet, flows the air sucked into the cavity toward the outlet, and exhausts the air through the outlet, wherein each of the two blowers passes air, that flows from the inlet to the outlet, through the filter, wherein the intake portion of one blower is disposed to face the intake portion of the other blower, wherein the inlet is located between the one blower and the other blower in an opposing direction in which the two intake portions face each other, wherein the inlet opens in a direction intersecting the opposing direction, and wherein the housing further comprises:

a partition, for partitioning the cavity in the opposing direction, including a first extension extending in an intersecting direction intersecting the opposing direction.

2. The air purifier according to claim 1, wherein the partition further comprises:

a second extension extending in the opposing direction.

3. The air purifier according to claim 2, wherein the second extension is provided at a center of the first extension in the intersecting direction.

4. The air purifier according to claim 1, wherein the one blower is provided at one end of the housing in the opposing direction and the other blower is provided at the other end of the housing in the opposing direction, and wherein the filter is provided between the two blowers in the opposing direction.

5. The air purifier according to claim 4, wherein the two blowers comprise an exhaust portion from which air is exhausted, the exhaust portion being located downstream of the airflow from the fan, wherein the housing is a substantially rectangular parallelepiped long in the opposing direction, wherein at least one of the intake portion and the exhaust portion of each of the two blowers is arranged at each of two first surfaces among six surfaces of the housing so as to face each other in the opposing direction, and wherein the inlet is provided on at least one of four second surfaces other than the two first surfaces among the six surfaces of the housing.

6. The air purifier according to claim 5, wherein the inlet is provided on at least two of the four second surfaces.

7. The air purifier according to claim 6, wherein the housing further comprises:

a closing mechanism for closing the inlet.

8. The air purifier according to claim 1, wherein each of the two blowers further comprises:

a casing;

a motor fixed to the casing; and a fan driven by the motor, and wherein each of the two blowers is an axial-flow blower having a rotation shaft extending in the opposing direction.

9. The air purifier according to claim 1, further comprising:

a louver for adjusting the direction of the air blown out from each of the two blowers.

10. The air purifier according to claim 6, wherein the inlet is provided on at least two suction surfaces adjacent to each other among the four second surfaces, wherein the housing is configured such that a detachable inlet, which is the inlet provided on any one of the at least two suction surfaces, is detachable, wherein at least part of the filter is exposed when the detachable inlet is detached from the housing and comprises a shape-retaining member provided at an end of the filter in the opposing direction for retaining a shape of the filter so that a cross section of the filter in a direction intersecting the opposing direction is U-shaped.

11. The air purifier according to claim 10, wherein the shape-retaining member comprises a grip portion that protrudes on an opposite side to an opening direction in the U-shape of the filter.

12. An air purifier comprising:

a housing having a cavity formed inside, the housing further having an inlet and an outlet;

a first blower having a first fan located in the housing;

a second blower having a second fan located in the housing, the second blower facing the first blower in an opposing direction; and a filter in the housing, wherein the inlet is located between the first blower and the second blower in the opposing direction, wherein the inlet opens in a direction intersecting the opposing direction, whereby the first fan and the second fan generate airflow such that air flows into the cavity through the inlet, and flows from the cavity through the filter to the outlet, and wherein the housing further comprises:

a first extension extending in an intersecting direction intersecting the opposing direction; and a partition for partitioning the cavity in the opposing direction.

13. The air purifier according to claim 12, wherein the partition further comprises:

a second extension extending in the opposing direction.

14. The air purifier according to claim 13, wherein the second extension is provided at a center of the first extension in the intersecting direction.

15. The air purifier according to claim 12, wherein the first blower is located at one end of the housing in the opposing direction, wherein the second blower is located at the other end of the housing in the opposing direction, and wherein the filter is located between the first blower and the second blower in the opposing direction.

16. The air purifier according to claim 15, wherein the housing is a substantially rectangular parallelepiped long in the opposing direction and includes a first surface, a second surface, and a third surface, wherein the outlet is located on the first surface and the second surface such that the outlet on the first surface faces the outlet on the second surface, and wherein the inlet is located on the third surface.

17. The air purifier according to claim 16, further comprises:

a lid configured to be attached to and detached from the third surface of the housing, wherein the lid has through holes as the inlet on the third surface.

18. The air purifier according to claim 17, wherein the filter further comprises:

a shape-retaining member, having a U-shape, located at an end of the filter in the opposing direction; and a grip portion, and wherein, when the lid is attached to the third surface, the filter is positioned such that the grip portion is below the lid.

* * * * *